United States Patent [19]

Tanaka

[11] Patent Number: 4,815,576

[45] Date of Patent: Mar. 28, 1989

[54] TWIN-TUBE TYPE SHOCK ABSORBER WITH A BASE VALVE PORTION STRUCTURE COUPLED BY CAULKING

[75] Inventor: Toshio Tanaka, Susono, Japan

[73] Assignee: Toyota Jidosha Kabushiki Kaisha, Toyota, Japan

[21] Appl. No.: 171,186

[22] Filed: Mar. 18, 1988

Related U.S. Application Data

[63] Continuation of Ser. No. 946,033, Dec. 24, 1986, abandoned.

[30] Foreign Application Priority Data

Dec. 26, 1985 [JP] Japan .................. 60-199349[U]

[51] Int. Cl.⁴ ............................................. F16F 9/34
[52] U.S. Cl. .................................. 188/315; 29/522.1; 137/854; 188/322.14; 411/501
[58] Field of Search ................. 188/322.13, 322.14, 188/322.15, 282, 317, 315; 137/852, 854, 859; 411/501, 502, 503, 504, 505, 506, 507; 29/522.1

[56] References Cited

U.S. PATENT DOCUMENTS

| | | | |
|---|---|---|---|
| 2,159,289 | 5/1939 | Nickelsen | 137/854 X |
| 2,626,685 | 1/1953 | Brundrett | 188/315 |
| 3,869,956 | 3/1975 | Breer | 411/506 |
| 3,958,673 | 5/1976 | Allinquant et al. | 188/322.14 |
| 4,146,118 | 3/1979 | Zankl | 411/501 X |
| 4,221,041 | 9/1980 | Hufnagel et al. | 411/501 X |

FOREIGN PATENT DOCUMENTS

| | | |
|---|---|---|
| 834622 | 3/1952 | Fed. Rep. of Germany . |
| 958532 | 1/1957 | Fed. Rep. of Germany . |
| 2312925 | 12/1976 | France . |
| 3202721 | 8/1983 | France . |
| 59-32743 | 2/1984 | Japan . |

OTHER PUBLICATIONS

Patent Abstracts of Japan, vol. 5, No. 147 (M-88) [819], Sep. 17, 1981; & JP-A-56 76 741 (Showa Seisakusho K. K.), Jun. 24, 1981.

*Primary Examiner*—George E. A. Halvosa
*Attorney, Agent, or Firm*—Oblon, Fisher, Spivak, McClelland & Maier

[57] ABSTRACT

A twin-tube type shock absorber in which a base valve, a leaf valve and a washer plate are squeezed by a flange portion and a caulked portion of a valve guide. The washer plate has a taper-cut surface of an upper corner of a center hole of the washer plate. When the caulked portion is formed by adding an extremely large axial compression force on the rod portion of the valve guide during construction of the shock absorber, the taper-cut surface prevents the caulking force from being transmitted from the washer plate to the leaf valve and prevents the permanent deformation of the leaf valve due to the caulking force. Thus, stable operation of the leaf valve and stable operation of the shock absorber are assured.

9 Claims, 3 Drawing Sheets

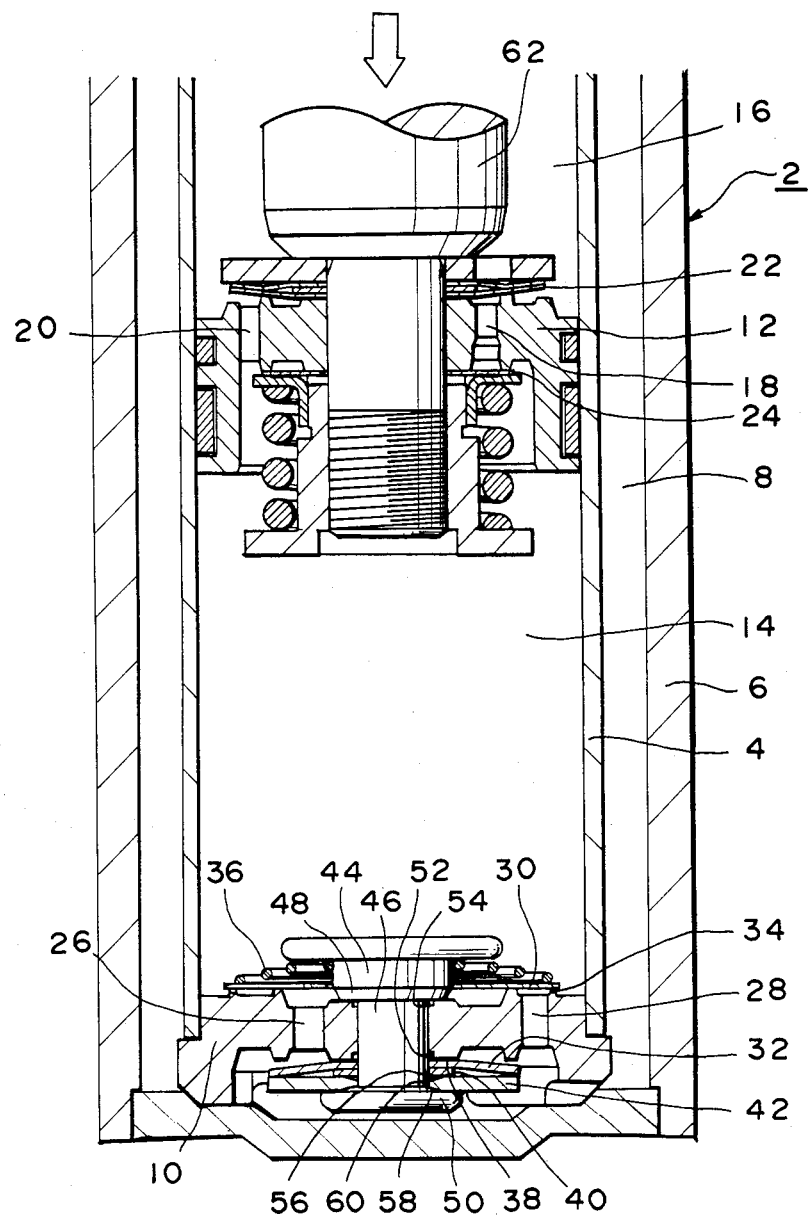

TWIN-TUBE TYPE SHOCK ABSORBER WITH A BASE VALVE PORTION STRUCTURE COUPLED BY CAULKING

This application is a continuation of application Ser. No. 946,033, filed on Dec. 24, 1986, now abandoned.

BACKGROUND OF THE INVENTION

1. Field of the Invention:

The present invention relates to a hydraulic twin-tube type shock absorber with a leaf valve and a washer plate which are coupled to a base valve by caulking a valve guide and more specifically relates to a structure for preventing the leaf valve from being permanently deformed when the valve guide is caulked during construction of the shock absorber.

2. Description of the Prior Art:

A hydraulic shock absorber composes one member of a suspension system for a vehicle and functions to damp bound/rebound motion of the vehicle. A conventional twin-tube type shock absorber comprises an outer shell and a cylinder disposed within the outer shell. A space defined between the outer shell and the cylinder is filled with gas and oil and constitutes a reservoir chamber. The reservoir chamber is separated from a space inside of the cylinder by a base valve which is fixed to a lower end portion of the cylinder. The base valve has a damping port and a return port, and oil flowing through the damping port generates a damping force under a compression stroke of the shock absorber. A piston which is slidably inserted in the cylinder divides the space inside the cylinder into two chambers. The piston has a damping port and a return port, and the oil flowing between the two chambers through the damping port generates a damping force under a tension stroke of the shock absorber. A piston-rod which is fixed to the piston penetrates an upper end plate of the shock absorber and an upper end portion of the piston-rod is connected to a member of the vehicle.

As shown in FIG. 5, the structure of the base valve portion of the conventional shock absorber comprises a base valve 100, an annular leaf valve 102 for varying an opening area of the damping port by being elastically deformed, a leaf valve seat 118 provided on the lower side of an inner portion of the leaf valve 102, an annular washer plate 116 provided on the lower side of the leaf valve seat 118, and a valve guide 110 having a rod portion which penetrates the base valve 100, the leaf valve 102, the leaf valve seat 118 and the washer plate 116. The valve guide 110 has a flange portion at an upper end portion and a caulked portion 112 at a lower end portion. The caulked portion 112 is formed after the base valve 100, the leaf valve 102, the leaf valve seat 118 and the washer plate 116 have been mounted onto the rod portion, and these members are squeezed together between the flange portion and the caulked portion 112. For the purpose of preventing mutual rotation between these members around their axis, the caulked portion 112 must be caulked sufficiently to communicate to the members a sufficient squeezing force. When the valve guide 110 is sufficiently caulked, the washer plate 116 receives a large axial force from the caulked portion 112 and especially the radially inner portion of the washer plate 116 receives an extremely large axial force from the rounded portion which is naturally formed between the upper surface of the caulked portion 112 and the outside surface of the rod portion of the valve guide 110.

The base valve 100 is usually formed of a sintered material. In case the base valve 100 is constructed of a sintered material, upper and lower corners of the center hole of the base valve 100 is likely to be fractured when the center hole is perforated by a press. Therefore, step-like recesses 108 and 106 which recede from the upper surface 104 and the lower surface 102 of the base valve 100, respectively, are preferably formed at the upper and lower corners of the center hole of the base valve 100, though such recesses 108 and 106 should not be included in a prior art. In case such recesses 108 and 106 are provided in the base valve 100, the radially inner portion of the washer plate 116 will be pushed and deformed toward the step-like recess 106 and as a result, the radially inner portion of the leaf valve seat and the radially inner portion of the leaf valve 118 will be permanently deformed into the step-like recess 106 when the lower end portion of the valve guide 110 is caulked. Such permanent deformation the leaf valve 118 will deteriorate a smooth contact of the leaf valve 118 with the seat surface 114 of the base valve 100 and stable damping characteristics under a compression stroke will not be obtained. Further, such permanent deformation of the leaf valve 118 which is usually constructed of a laminated member of thin plates will cause gaps 120 between the thin plates, that is, mutual separation of the thin plates and may destroy the leaf valve 118.

SUMMARY OF THE INVENTION

An object of the present invention is to suppress the permanent deformation of a leaf valve when a valve guide is caulked during construction of a shock absorber and to obtain desirable damping characteristics of the shock absorber.

The above object can be attained, according to the present invention, by a twin-tube type shock absorber having the following base valve portion structure. The structure comprises:

(a) a base valve fixed to a lower portion of a cylinder, the base valve having a center hole formed therein, a damping port and a return port wherein a step-like annular recess is formed at a lower corner of the center hole;

(b) an elastically deformable leaf valve provided on a lower side of the base valve, the leaf valve having a center hole formed therein, the leaf valve being adapted to cover the damping port for varying the opening area of the damping port by being elastically deformed;

(c) a leaf valve seat provided on a lower side of the leaf valve, the leaf valve seat having a center hole formed therein;

(d) a washer plate provided on a lower side of the leaf valve seat, the washer plate having a center hole formed therein and an upper surface, the washer plate having, at an upper corner of the center hole of the washer plate, a taper-cut surface which recedes downwardly from a radial extension of the upper surface of the washer plate; and (e) a valve guide including a rod portion, a flange portion formed at an upper end portion of the valve guide, and a caulked portion formed at a lower end portion of the valve guide wherein the rod portion penetrates the center hole of the base valve, the center hole of the leaf valve, the center hole of the leaf valve seat and the center hole of the washer plate, and wherein the flange portion and the caulked portion squeezes the base valve, the leaf valve, the leaf valve seat and the washer plate therebetween.

In the shock absorber thus constructed, when the valve guide is caulked and a large axial caulking force acts on the washer plate during construction of the shock absorber, the inner rim portion of the leaf valve does not receive the axial force from the washer plate because of the provision of the taper-cut surface of the washer plate and is not permanently deformed into the step-like annular recess of the base valve. Thus, permanent deformation of the radially inner portion of the leaf valve and generation of gaps between laminated thin plates constructing the leaf valve are prevented during construction of the shock absorber, and desirable damping characteristics can be obtained.

BRIEF DESCRIPTION OF THE DRAWINGS

These and other objects and advantages of the present invention will become more apparent and more readily appreciated from the following detailed description of the preferred exemplary embodiments of the invention taken in conjunction with the accompanying drawings, wherein

FIG. 3 is a sectional view of a lower portion of the shock absorber according to the present invention;

DETAILED DESCRIPTION OF THE PREFERRED EMBODIMENT

Figure 1:
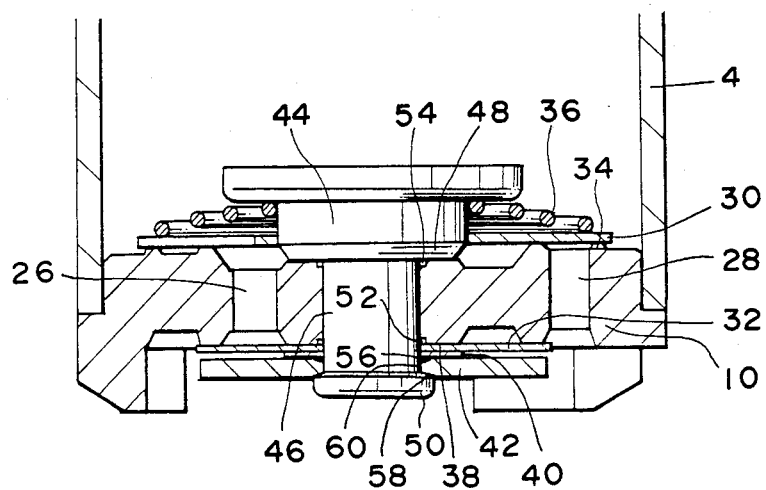
FIG. 1 is a sectional view a base valve and the vicinity thereof of a twin-tube type shock absorber according to the present invention.

FIGS. 1-4 show an twin-tube type shock absorber. The twin-tube type shock absorber 2 includes a cylinder 4 and an outer shell 6 which is disposed outside of the cylinder 4 and is arranged co-axially with the cylinder 4. The cylinder 4 and the outer shell 6 constitute the twin tubes of the shock absorber 2. A reservoir chamber 8 is formed between the cylinder 4 and the outer shell 6. An upper portion of the reservoir chamber 8 is filled with gas and a lower portion of the reservoir chamber 8 is filled with a damping liquid, for example, an oil. Hereinafter, an oil will be used as the damping liquid for clarification of explanation but the damping liquid is not limited to oil. The space inside of the cylinder 4 is filled with the oil. A base valve 10 is fixed to the lower end portion of the cylinder 4. The base valve 10 separates the space inside of the cylinder 4 from the reservoir chamber 8 but allows for a controlled flow of the oil between the reserver chamber 8 and the space inside the cylinder 4. A piston 12 is slidably inserted in the cylinder 4 and can move in the axial direction of the shock absorber 2. The piston 12 separates the space inside of the cylinder 4 into two chambers, that is, a piston lower chamber 14 and a piston upper chamber 16 but allows for a controlled flow of the oil between both chambers 14 and 16. A piston-rod 62 is coupled with the piston 12. The piston-rod 62 penetrates an upper end plate of the shock absorber 2 and extends upward.

As shown in FIG. 3, the piston 12 has two kinds of ports, that is, a damping port 18 for generating a damping force at a compression stroke of the shock absorber 2 and a return port 20. The damping port 18 and the return port 20 are opened/closed by a non-return valve 22. An elastically deformable leaf valve 24 is provided for the damping port 18. The leaf valve 24 varies the cross sectional area of the opening of the damping port 18 by being elastically deformed and controls the flow of the oil from the piston upper chamber 16 through the damping port 18 to the piston lower chamber 14 when the pressure of the piston upper chamber 16 becomes considerably higher than the pressure of the piston lower chamber 14.

As shown in FIGS. 1 and 3, the base valve 10 has two kinds of ports, that is, a damping port 26 for generating a damping force at a tension stroke of the shock absorber 2 and a return port 28. A non-return valve 30 is provided on the chamber 14 side of the damping port 26 and the return port 28. The non-return valve 30 is pushed against the base valve 10 by a spring 36. An elastically deformable leaf valve 32 which is constructed of an annular spring steel plate is provided on the reservoir chamber 8 side of the damping port 26. The leaf valve 32 varies the cross sectional area of the opening of the damping port 26 and extends transverse to the longitudinal axis of the shock absorber i.e., at substantially a right angle by being elastically deformed and controls the oil flow through the damping port 26. A port 34 is formed in the base valve 10 so as to correspond to an upper end of the return port 28 and the port 34 constitutes a port having a small fixed cross sectional area as shown in FIG. 3.

Figure 2:
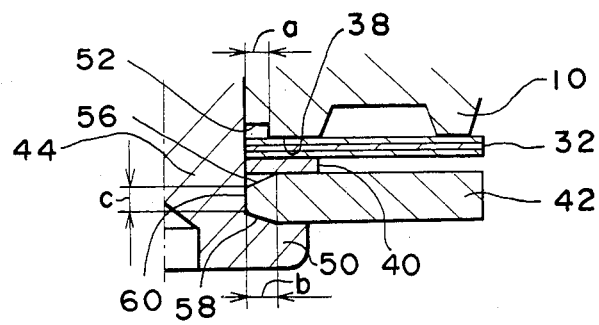
FIG. 2 is a sectional view of a washer plate and the vicinity thereof of the shock absorber of FIG. 1.

As shown in FIGS. 1 to 3, the base valve 10 is annular and has an axially extending hole at a radial center portion of the base valve 10. A lower surface of a radially inner portion of the base valve 10 constitutes a lower flat seat surface 38 against which the leaf valve 32 is pushed. A lower surface of a radially inner portion of the leaf valve 32 contacts an upper surface of a leaf valve seat 40 which is annular, the leaf valve seat being transverse to the longitudinal axis of the shock absorber, and is provided on the lower side of the leaf valve 32. A lower surface of the leaf valve seat 40 contacts an upper surface of a washer plate 42 which is in the form of an annular flat plate and is provided on the lower side of the leaf valve seat 40. The upper and lower surfaces of leaf valve seat 40 are at a substantially right angle to the longitudinal axis of the shock absorber. The center holes of base valve 10, the leaf valve 32, the leaf valve seat 40 and the washer plate 42 are penetrated by a rod portion 46 of a valve guide 44. At the chamber 14 side end portion of the valve guide 44, that is, at an upper portion of the valve guide 44, is formed a flange portion 48 which protrudes radially outward from the outside surface of the rod portion 46 of the valve guide 44. At the reserver chamber 8 side end portion of the valve guide 44, that is, a lower end portion of the valve guide 44, is formed a caulked portion 50 which is formed by applying a large axial caulking force on the rod portion 46 of the valve guide 44. The base valve 10, the leaf valve 32, the leaf valve seat 40 and the washer plate 42 are squeezed by the flange portion 48 and the caulked portion 50. The caulked portion 50 is caulked after the base valve 10, the leaf valve 32, the leaf valve seat 40 and the washer plate 42 have been mounted on the rod portion 42 of the valve guide 44.

The base valve 10 is usually constructed of a sintered material. Step-like recesses 54 and 52 which recede from the upper surface and the lower surface of the base valve 10, respectively, are formed at an upper corner and a lower corner of the center hole of the base valve 10, respectively, for the purpose of preventing the corners from being fractured when the center hole is perforated by a press.

As shown in FIG. 2, a taper-cut surface 56 is formed at the leaf valve seat 40 side corner, that is, at the upper corner of the center hole of the washer plate 42. The taper-cut surface 56 recedes downwardly from the radial extension of the upper surface of the washer plate 42. The taper-cut surface 56 may be an obliquely radially extending surface, a rounded convex or concave surface extending in the radial direction, or a step-like receding surface. The axial distance between the taper-cut surface 56 and a radial extension of the upper surface of the washer plate 42, desirably, gradually increases radially inwardly. The taper-cut surface 56 is formed along the entire circumference of the upper corner of the center hole of the washer plate 42. The radial size b of the taper-cut surface 56 is equal or nearly equal to the radial size a of the step-like recess 52 which is formed at the lower corner of the center hole of the base valve 10. Taper-cut surface 56 can be formed by machining, grinding or press-forming.

As shown in FIG. 2, another taper-cut surface 58 is formed at the side corner of the caulked portion 50, that is, at the lower corner of the center hole of the washer plate 42. However, the taper-cut surface 58 is not an indispensable surface. The taper-cut surface 58 recedes upwardly from the radial extension of the lower surface of the washer plate 42 and is cut in the radial direction such that an axial distance between the taper-cut surface 58 and a radial extension of the lower surface of the washer pate 42 gradually increases radially inwardly. The taper-cut surface 58 may be a straightly extending surface, a rounded concave or convex surface, or a step-like surface in the radial direction. The taper-cut surface 58 is formed along the entire circumference of the lower corner of the center hole of the washer plate 42. It is preferable to make the radial size of the taper-cut surface 58 equal to or nearly equal to the radial size b of the taper-cut surface 56.

The washer plate 42 has a guide surface 60 in the center hole of the washer plate 42 and between the taper-cut surfaces 56 and 58. The guide surface 60 contacts the outside surface of the rod portion of the guide valve 44 and the axial size of the guide surface 60 has an axial length c which is necessary to prevent swinging of the washer plate 42.

The washer plate 42 is constructed of spring steel for the purpose of preventing a local permanent deformation when the washer plate 42 receives a large axial force from the caulked portion 50 at the time of formation of the caulked portion 50.

Next, operation of the shock absorber 2 and the effects of the taper-cut surface 56 of the present invention will be explained.

The shock absorbing function of the shock absorber 2 is substantially the same as that of the conventional shock absorber.

Under bounding motion, that is, under a compression stroke of the shock absorber 2, when the piston 12 and the piston-rod 62 moves rapidly downward with respect to the cylinder 4, the pressure of the piston lower chamber 14 becomes high. The pressurized oil in the piston lower chamber 14 pushes the leaf valve 32 provided at the base valve 10 downward and flows through the damping port 26 into the reservoir chamber 8. The oil which tends to flow toward the upper side of the piston 12 pushes the non-return valve 22 provided at the piston 12 upward and flows through the return port 20 into the piston upper chamber 16. The flow resistance which is generated on the base valve 10 side provides a damping force of the shock absorber 2 under the downward movement of the piston 12.

Under the bound motion, when the piston 12 and the piston-rod 62 slowly move downward with respect to the cylinder 4, the pressure of the piston lower chamber 14 does not become relatively high. Thus, the oil in the piston lower chamber 14 can not deform the leaf valve 32 downward and the oil of the piston lower chamber 14 flows through the port 34 of a small area into the reservoir chamber 8. The oil which tends to flow toward the upper side of the piston 12 pushes the non-return valve 22 due to the pressure difference between the piston lower chamber 14 and the piston upper chamber 16 and flows through the return port 20 into the piston upper chamber 16.

Under rebounding motion, that is, under a tension stroke of the shock absorber 2, when the piston 12 and the piston-rod 62 moves rapidly upward with respect to the cylinder 4, the non-return valve 30 provided at the base valve 10 is moved upward due to the pressure difference between the reservoir chamber 8 and the piston lower chamber 14 and the oil flows from the reservoir chamber 8 through the return port 28 into the piston lower chamber 14. Since the pressure of the piston upper chamber 16 becomes high, the oil in the piston upper chamber 16 deforms the leaf valve 24 provided at the piston 12 downward and flows from the piston upper chamber 16 through the damping port 18 into the piston lower chamber 14. The flow resistance which is generated on the piston 12 side provides a damping force of the shock absorber 2 under the rebound motion.

Under the rebound motion, when the piston 12 and the piston-rod 62 slowly move upward, the pressure on the upper side of the piston 12 does not become relatively high. Thus, the oil of the piston upper chamber 16 can not deform the leaf valve 24 provided at the piston 12 downward and flows through another port (not shown) into the piston lower chamber 14. Under the rebound motion, the non-return valve 30 provided at the base valve 10 is moved upward due to the pressure difference between the reservoir chamber 8 and the piston lower chamber 14 and the oil in the reservoir chamber 8 flows through the return port 28 into the piston lower chamber 14.

Figure 5:
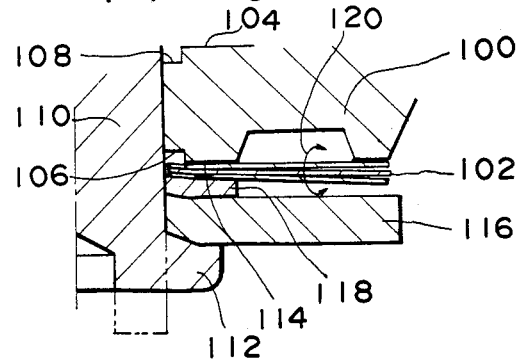
FIG. 5 is a sectional view of a washer plate and the vicinity thereof of a conventional shock absorber which is known except recesse formed in a base valve.
Figure 4:
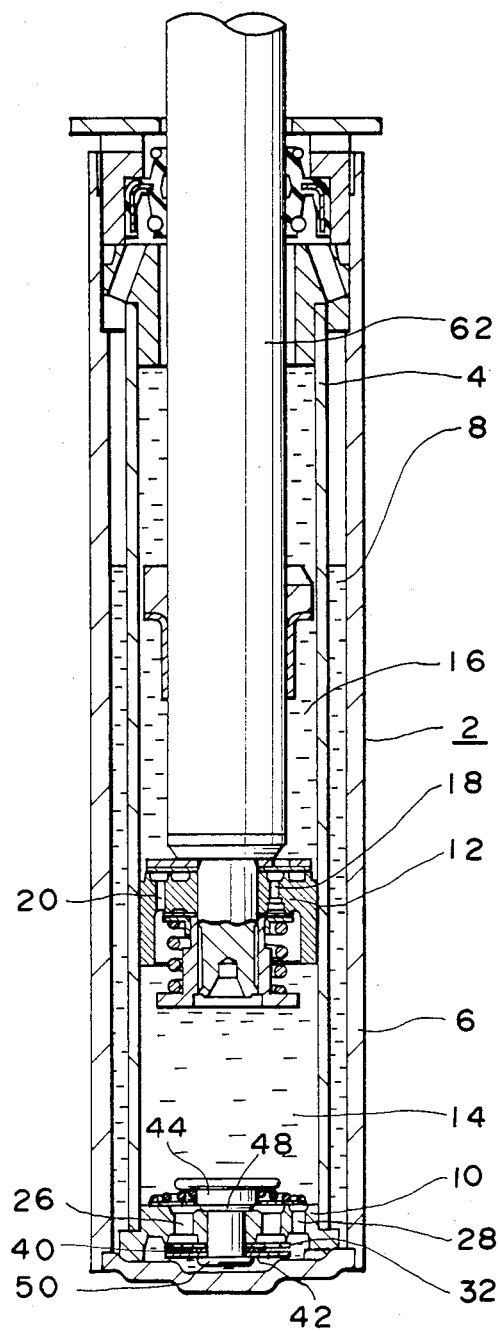
FIG. 4 is a sectional view of the entire portion of the shock absorber according to the present invention.

As mentioned above, the leaf valve 32 functions as a member for generating a damping force under a downward motion. Therefore, the leaf valve 32 is not allowed to deform permanently as shown in FIG. 5 and must be pushed against the seat surface 38 in the axial direction under a uniform force.

Next, the effects of the taper-cut surface 56 formed in the washer plate 42 will be explained. In construction of the shock absorber 2, the caulked portion 50 is formed by imposing a large axial caulking force on the lower end portion of the rod portion 46 of the valve guide 44. In the prior art, the force which acts on the washer plate 42 from the caulked portion 50 when the lower end portion of the rod 46 of the valve guide 44 is caulked is transmitted via the leaf valve seat 40 to the leaf valve 32. On the contrary, in the present invention, since the taper-cut surface 56 is formed in the washer plate 42, the radially inner portion of the leaf valve 32 closely adjacent to the center hole of the leaf valve 32 does not receive the axial compression force from the washer plate 42 and is not deformed permanently into the step-like recess 52 formed in the base valve 10. In addition, the generation of gaps between a plurality of the thin plates which constitute the leaf valve 32 is prevented. The fact that no permanent deformation of the leaf valve 32 at the time of caulking of the lower end portion of the valve guide 44 occurs during construction of the shock absorber 2 assures a uniform and an entire surface contact of the leaf valve 32 with the seat surface 38 of the base valve 10 and stable detachment of the leaf valve 32 from the seat surface 38, and further assures stable operation of the leaf valve 32 and stable generation of the damping force at the compression stroke. Thus, stable operation of the shock absorber 2 is obtained.

In case the taper-cut surface 58 is also formed at the lower corner of the center hole of the washer plate 42 and the size of the taper-cut surface 58 is set so as to be substantially the same as that of the taper-cut surface 56, the washer plate 42 has symmetric dimensions in the axial direction and therefore, can be mounted onto the rod portion 46 of the valve guide 44 without regard as to which surface of the washer plate 42 should be opposed to the leaf valve 32. This makes mounting of the washer plate 42 onto the guide valve 44 feasible and construction of the shock absorber 2 easy.

In the case where both taper-cut surfaces 56 and 58 are formed, the washer plate 42 still has a guide surface 60 of a necessary axial length and therefore, the washer plate 42 is prevented from being flattened.

Further, since the washer plate 42 is constructed of a spring steel material which is not likely to undergo local permanent deformation in comparison to usual steel material, the inner rim portion of the washer plate 42 is not likely to be deformed as a result of caulking of the lower end portion of the rod portion 46 of the valve guide 44. The lack of local permanent deformation of the washer plate 42 helps the leaf valve 32 operate normally.

Although only one preferred embodiment of the present invention has been described in detail, it will be appreciated by those skilled in the art that various modifications and alterations can be made of the preferred embodiment shown without materially departing from the novel teachings and advantages of this invention. Accordingly, it is to be understood that all such modifications and alterations are included within the scope of the invention as defined by the following claims.

What is claimed is:

1. A twin-tube type shock absorber having an outer shell and a cylinder slidably housing a piston, comprising:
   (a) a base valve fixed to a lower portion of the cylinder, the base valve having a lower flat seat surface portion, a center hole formed therein, a damping port and a return port wherein an annular recess is formed at a lower corner of the center hole;
   (b) an elastically deformable leaf valve provided on a lower side of the base valve and extending at substantially a right angle to a longitudinal axis of said shock absorber, the leaf valve having an upper flat surface in contact with said lower flat surface portion of said base valve and having a center hole formed therein, the leaf valve being adapted to cover the damping port for controlling the opening area of the damping port by being elastically deformed;
   (c) a leaf valve seat provided on a lower side of the leaf valve and having an outer radial dimension less than that of said leaf valve, the leaf valve seat having an upper and lower surface extending at substantially a right angle to said longitudinal axis of said shock absorber wherein said upper surface contacts said leaf valve, and said leaf valve seat having a center hole formed therein;
   (d) an annular flat washer plate provided on a lower side of the leaf valve seat, the washer plate having a center hole formed therein and an upper radial inner surface of said washer plate having a taper-cut surface which recedes downwardly from a radial extension of the upper surface of the washer plate at an upper corner of the center hole of the washer plate wherein said taper-cut surface of said washer plate is formed along an entire inner circumference of said washer plate, is radially tapered and is approximately equal in radial size to said recess formed at said lower corner of said center hole and said washer plate having an upper surface comprising a flat surface which extends at a right angle with respect to the axis of the twin-tube type shock absorber except for said taper-cut surface; and
   (e) a valve guide including a rod portion, a flange portion formed at an upper portion of the valve guide, and a caulked portion formed at a lower end portion of the valve guide wherein the rod portion penetrates the center hole of the base valve, the center hole of the leaf valve, the center hole of the leaf valve seat and the center hold of said washer plate; the flange portion and the caulked portion squeezes the base valve, the leaf valve, the leaf valve seat and the washer plate therebetween; and wherein said taper-cut surface of said washer plate prevents application of an axial compressive caulking force to a radially inner portion of said leaf valve when said lower end portion of said valve guide is caulked.

2. The shock absorber of claim 1 wherein the washer plate has a guide surface for slidably contacting the outside surface of the rod portion of the guide valve between the taper-cut surface and a lower surface of the washer plate.

3. The shock absorber of claim 1 wherein the washer plate comprises a spring steel washer plate.

4. The shock absorber of claim 1 wherein the taper-cut surface comprises a surface which extends straight in the radial direction of the washer plate and extends obliquely downward from the upper surface of the washer plate to a surface of the center hole of the washer plate.

5. A twin-tube type shock absorber having an outer shell and a cylinder slidably housing a piston, comprising:
   (a) a base valve fixed to a lower portion of the cylinder, the base valve having a lower flat seat surface portion, a center hole formed therein, a damping port and a return port wherein an annular recess is formed at a lower corner of the center hole;
   (b) an elastically deformable leaf valve provided on a lower side of the base valve and extending transverse to a longitudinal axis of said shock absorber, the leaf valve having an upper flat surface in contact with said lower surface portion of said base valve and having a center hole formed therein, the leaf valve being adapted to cover the damping port for varying the opening area of the damping port by being elastically deformed;

(c) a leaf valve seat provided on a lower side of the leaf valve and having an outer radial dimension less than that of said leaf valve, the leaf valve seat having an upper and lower surface extending at substantially a right angle to said longitudinal axis of said shock absorber wherein said upper surface contacts with said leaf valve, and said leaf valve seat having a center hole formed therein;

(d) an annular flat washer plate provided on a lower side of the leaf valve seat, the washer plate having a center hole formed therein, an upper surface and a lower surface, the washer plate having a first taper-cut surface which recedes downwardly from a radial extension of the upper surface of the washer plate at an upper corner of the center hole of the washer plate, having a second taper-cut surface which recedes upwardly from a radial extension of the lower surface of the washer plate at a lower corner of the center hole of the washer plate wherein said first and second taper-cut surfaces are formed on a side corner of said washer plate, are formed along an entire circumference of said washer plate, are radially tapered and are approximately equal in radial size to said recess formed at said lower corner of said center hole and said washer plate having an upper surface comprising a flat surface which extends at substantially a right angle with respect to the axis of the twin-tube type shock absorber except for said taper-cut surface; and (e) a valve guide including a rod portion, a flange portion formed at an upper end portion of the valve guide, and a caulked portion formed at a lower end portion of the valve guide wherein the rod portion penetrates the center hole of the base valve, the center hole or the leaf valve, the center hole or the leaf valve seat and the center hole of the washer plate, and wherein the flange portion and the caulked portion squeezes the base valve, the leaf valve, the leaf valve seat and the washer plate therebetween and wherein said taper-cut surface of said washer plate prevents application of an axial compressive caulking force to a radially inner portion of said leaf valve when said lower end portion of said valve guide is caulked.

6. The shock absorber of claim 5 wherein the sizes of the first taper-cut surface and the second taper-cut surface of the washer plate are substantially the same as that of the recess of the base valve in a radial direction.

7. The shock absorber of claim 5 wherein the washer plate has a guide surface which slidably contacts an outside surface of the rod portion of the valve guide between the first taper-cut surface and the second taper-cut surface.

8. The shock absorber of claim 5 wherein the washer plate comprises a spring steel washer plate.

9. The shock absorber of claim 5 wherein the first taper-cut surface comprises a surface which extends straight in the radial direction of the washer plate and extends obliquely downward from the upper surface of the washer plate to a surface of the center hole of the washer plate and wherein the second taper-cut surface comprises a surface which extends straight in the radial direction of the washer plate and extends obliquely upward from the lower surface of the washer plate to the surface of the center hole of the washer plate.

* * * * *